(12) United States Patent
Nisbet et al.

(10) Patent No.: US 12,511,530 B2
(45) Date of Patent: Dec. 30, 2025

(54) SYSTEM, METHOD AND APPARATUS FOR INTELLIGENT CACHING

(71) Applicant: HUAWEI TECHNOLOGIES CO., LTD., Guangdong (CN)

(72) Inventors: James Trevor Nisbet, Whitby (CA); Jesse Ka-Leung Lee, Markham (CA); Xun Xue, Markham (CA); Robin Dawn Grosman, Markham (CA); Nattavut Sutyanyong, Thornhill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1024 days.

(21) Appl. No.: 17/115,094

(22) Filed: Dec. 8, 2020

(65) Prior Publication Data
US 2022/0180176 A1 Jun. 9, 2022

(51) Int. Cl.
*G06N 3/08* (2023.01)
*G06F 11/10* (2006.01)
*G06F 12/0855* (2016.01)

(52) U.S. Cl.
CPC .......... *G06N 3/08* (2013.01); *G06F 11/1004* (2013.01); *G06F 12/0855* (2013.01)

(58) Field of Classification Search
CPC .......... G06N 3/08; G06N 3/0895; G06N 3/09; G06N 3/091; G06N 3/09294; G06N 3/96; G06N 3/98; G06N 3/0985; G06N 3/063; G06F 11/1004; G06F 12/0855;
(Continued)

(56) References Cited

U.S. PATENT DOCUMENTS

| 5,978,951 A * | 11/1999 | Lawler | H04L 49/309 |
| | | | 370/392 |
| 9,495,207 B1 * | 11/2016 | Pjesivac-Grbovic | ... G06F 9/544 |
| 10,426,442 B1 * | 10/2019 | Schnorr | A61B 8/5223 |

(Continued)

FOREIGN PATENT DOCUMENTS

| CN | 109313723 A | 2/2019 |
| CN | 110471883 A | 11/2019 |
| WO | 2020201835 A1 | 10/2020 |

OTHER PUBLICATIONS

International Search Report and Written Opinion issued in co-pending International application No. PCT/CN2021/134924 on Feb. 28, 2022.

*Primary Examiner* — Daniel T Pellett
(74) *Attorney, Agent, or Firm* — BCF LLP

(57) ABSTRACT

The disclosed systems and methods are directed to generating cache IDs for each of a plurality of AI training pipelines, accessing training data elements included in a training data set, generating IDs corresponding to the training data elements, receiving the data IDs and an associated cache ID, randomizing the data IDs, selecting a subset of the randomized data IDs, fetching the training data elements previously cached by a cache node, receiving a portion of the training data elements present in the caching server corresponding to the subset of randomized data IDs, forwarding the portion of the training data elements present in the caching server to at least one consumer node, fetching the remaining training data elements associated with the subset of randomized data IDs from the training data set, and forwarding the remaining training data elements to at least one transformation node for training the neural network.

7 Claims, 11 Drawing Sheets

(58) Field of Classification Search
CPC ............. G06F 12/0802; G06F 12/0888; G06F 12/1018; G06F 12/00
See application file for complete search history.

(56) References Cited

U.S. PATENT DOCUMENTS 10,949,353 B1 * 3/2021 Tighe .................... G06N 20/00
2012/0154373 A1 6/2012 Finocchio et al.

* cited by examiner

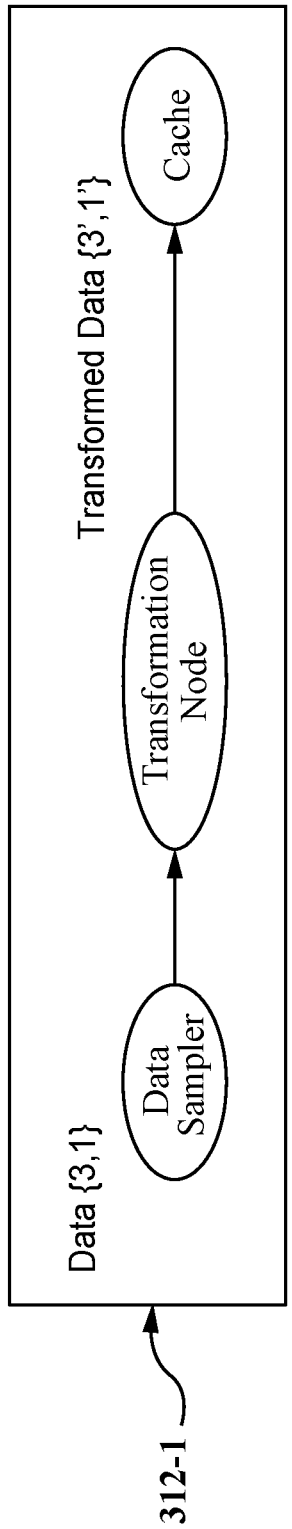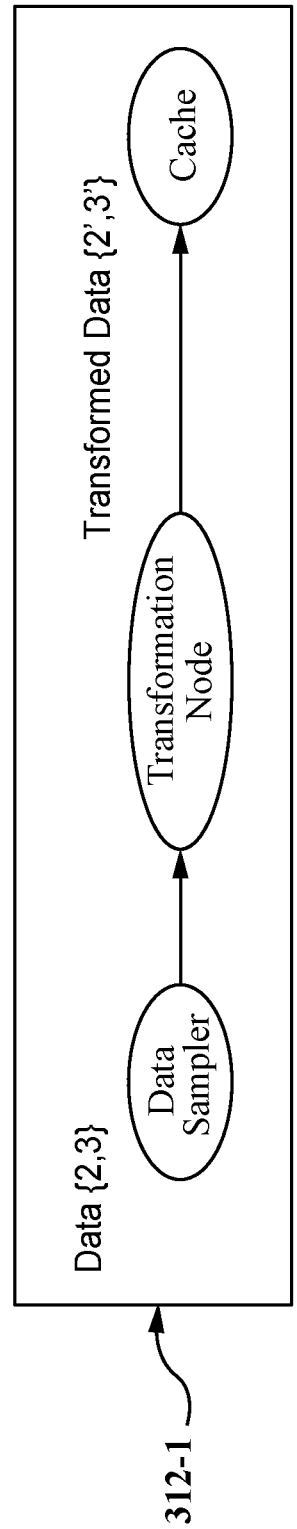
FIG. 3C (Prior Art)
FIG. 3D (Prior Art)

SYSTEM, METHOD AND APPARATUS FOR INTELLIGENT CACHING

CROSS-REFERENCE TO RELATED APPLICATIONS

This is the first application filed for the instantly disclosed technology.

TECHNICAL FIELD

The present disclosure generally relates artificial intelligence (AI) and, in particular, to a system, and a method for an intelligent caching system associated with an AI training framework.

BACKGROUND

In the world of artificial intelligence (AI), a neural network/model is trained by repeatedly feeding it with a training data set. After each pass of the training data set, the neural network/model is adjusted and becomes more accurate. A single pass of the training data set through the neural network/model during a training run is referred to as an epoch. Such as, for example, if the neural network/model is for images classification, then to train it there may be 1.5 million images to train against. In such a training run, each pass through the training dataset (1.5 million images in this example) is called an epoch. In machine learning, a neural network/model will not become accurate until it has been run through many epochs worth of training.

In many AI training frameworks, the training is implemented as pipelines, the neural network/model are trained by running through many epochs and same data is repeatedly processed over and over and asking for a caching solution. A cache is a general term used in many different disciplines in computer science. It refers to a "save area". Data can be put into a cache and retrieved from a cache. Caches can be in-memory only, or some caches can be backed by files in the filesystem. A cache is desirable if there are frequent access to the same data repeatedly. For example, if a computer system reads some data from a file, and the same data is accessed over and over, it would make more sense to cache the file in memory so that the computer system is not repeatedly going through the file handling and IO to read the data.

Although the concept of caching is not new in computer systems, in AI training pipelines, however, this concept is not widely deployed in all frameworks. Certain existing frameworks caches entire data set into memory or a file and a user must include the cache operator at a specific place in the framework to indicate where to cache the data. If the amount of the memory or the disk is not enough to cache the entire data, such frameworks raise an error. Other AI platforms such do not have a built-in caching operator and users must write their own caches.

Since the nature of AI training is to train on the same set of data for multiple iterations (i.e., multiple epochs), the data will have to be read from storage multiple times. Thus, there is an interest in improving the performance of such AI training frameworks by caching the data and utilizing the cached data in an efficient manner.

SUMMARY

The embodiments of the present disclosure have been developed based on developers' appreciation of shortcomings associated with the prior art namely, placing and utilizing a cache node in an artificial intelligence (AI) training pipeline in an efficient manner.

In accordance with the first broad aspect of the present disclosure, there is provided a system comprising: a plurality of AI training pipelines training a neural network, each of the plurality of AI training pipelines including a plurality of nodes and a leaf node containing a sampler; a training data set including training data elements; a controller configured to generate cache IDs for each of the plurality of AI training pipelines; wherein, the leaf node configured to communicate with the training data set to access the training data elements and generate data identities (IDs) corresponding to the training data elements; wherein, the sampler configured to receive the data IDs from the associated leaf node, and an associated cache ID from the controller, wherein, the sampler is further configured to: randomize the data IDs, select a subset of the randomized data IDs, communicate with the caching server, using the subset of randomized data IDs and the cache ID, to fetch the training data elements previously cached by a cache node, receive, from the caching server, a portion of the training data elements present in the caching server corresponding to the subset of randomized data IDs, forward the portion of the training data elements present in the caching server to at least one consumer node, and instruct the leaf node to fetch the remaining training data elements associated with the subset of randomized data IDs from the training data set; and wherein, the leaf node is further configured to fetch the remaining training data elements associated with the subset of randomized data IDs from the training data set and forward the remaining training data elements to at least one transformation node for training the neural network.

In accordance with other aspects of the present disclosure, the system, wherein the controller generates the cache IDs by executing a cyclic redundancy code (CRC) algorithm for each of the plurality of AI training pipelines and computing the associated checksums.

In accordance with other aspects of the present disclosure, the system, wherein the two AI training pipelines having the same cache IDs share a same allocated cache memory in the caching server.

In accordance with other aspects of the present disclosure, the system, wherein the controller places the cache node in the AI training pipeline, placing the cache node includes: placing at least one non-functional cache node in the AI training pipeline; performing a run-time analysis of the at least one non-functional cache node; and replacing the at least one non-functional cache node with a functional cache node in accordance with a performance of the at least one non-functional cache node.

In accordance with other aspects of the present disclosure, the system, wherein the at least one non-functional cache node is placed in accordance with a position in the AI training pipeline satisfying a set of rules during compilation of the AI training pipeline.

In accordance with other aspects of the present disclosure, the system, wherein the run-time analysis includes passing of the training data elements through the AI training pipeline and computing the associated run-time metrics at the at least one non-functional cache node.

In accordance with other aspects of the present disclosure, the system, wherein the controller evaluates the performance of the at least one non-functional cache node by analyzing the run-time analysis.

In accordance with other aspects of the present disclosure, the system, wherein the controller removes the at least one non-functional node from the AI training pipeline if the performance is not satisfactory.

In accordance with the second broad aspect of the present disclosure, there is provided a method comprising: generating, by a controller, cache IDs for each of a plurality of AI training pipelines; accessing, by a leaf node, training data elements included in a training data set; generating, by the leaf nodes, data identities (IDs) corresponding to the training data elements; receiving, by a sampler, the data IDs and an associated cache ID; randomizing, by the sampler, the data IDs; selecting, by the sampler, a subset of the randomized data IDs; communicating, by the sampler with a caching server, using the subset of randomized data IDs and the cache ID, to fetch the training data elements previously cached by a cache node; receiving, by the sampler from the caching server, a portion of the training data elements present in the caching server corresponding to the subset of randomized data IDs; forwarding, by the sampler, the portion of the training data elements present in the caching server to at least one consumer node; fetching, by the leaf node, the remaining training data elements associated with the subset of randomized data IDs from the training data set; and forwarding, by the leaf node, the remaining training data elements to at least one transformation node for training the neural network.

In accordance with other aspects of the present disclosure, the method, wherein the cache IDs are generated by executing a cyclic redundancy code (CRC) algorithm for each of the plurality of AI training pipelines and computing the associated checksums.

In accordance with other aspects of the present disclosure, the method, wherein the two AI training pipelines having the same cache IDs share a same allocated cache memory in a caching server.

In accordance with other aspects of the present disclosure, the method further includes placing, by the controller, the cache node in the AI training pipeline, placing the cache node includes: placing at least one non-functional cache node in the AI training pipeline; performing a run-time analysis of the at least one non-functional cache node; and replacing the at least one non-functional cache node with a functional cache node in accordance with a performance of the at least one non-functional cache node.

In accordance with other aspects of the present disclosure, the method, wherein the at least one non-functional cache node is placed in accordance with a position in the AI training pipeline satisfying a set of rules during compilation of the AI training pipeline.

In accordance with other aspects of the present disclosure, the method, wherein the run-time analysis includes passing of the training data elements through the AI training pipeline and computing the associated run-time metrics at the at least one non-functional cache node.

In accordance with other aspects of the present disclosure, the method further includes, evaluating, by the controller, the performance of the at least one non-functional cache node by analyzing the run-time analysis.

In accordance with other aspects of the present disclosure, the method further includes removing, by the controller, the at least one non-functional node from the AI training pipeline if the performance is not satisfactory.

In accordance with the third broad aspect of the present disclosure, there is provided a method comprising: placing, by a controller, a cache node in an AI training pipeline, wherein, placing the cache node includes: placing at least one non-functional cache node in the AI training pipeline; performing a run-time analysis of the at least one non-functional cache node; and replacing the at least one non-functional cache node with a functional cache node in accordance with a performance of the at least one non-functional cache node.

In accordance with other aspects of the present disclosure, the method, wherein the at least one non-functional cache node is placed in accordance with a position in the AI training pipeline satisfying a set of rules during compilation of the AI training pipeline.

In accordance with other aspects of the present disclosure, the method, wherein the run-time analysis includes passing of the training data elements through the AI training pipeline and computing the associated run-time metrics at the at least one non-functional cache node.

In accordance with other aspects of the present disclosure, the method, further includes, evaluating, by the controller, the performance of the at least one non-functional cache node by analyzing the run-time analysis.

BRIEF DESCRIPTION OF THE FIGURES

Further features and advantages of the present disclosure will become apparent from the following detailed description, taken in combination with the appended drawings, in which:

FIGS. 3C-3E (Prior Art) depicts high-level block diagrams of conventional AI training pipelines;

Figure 1:
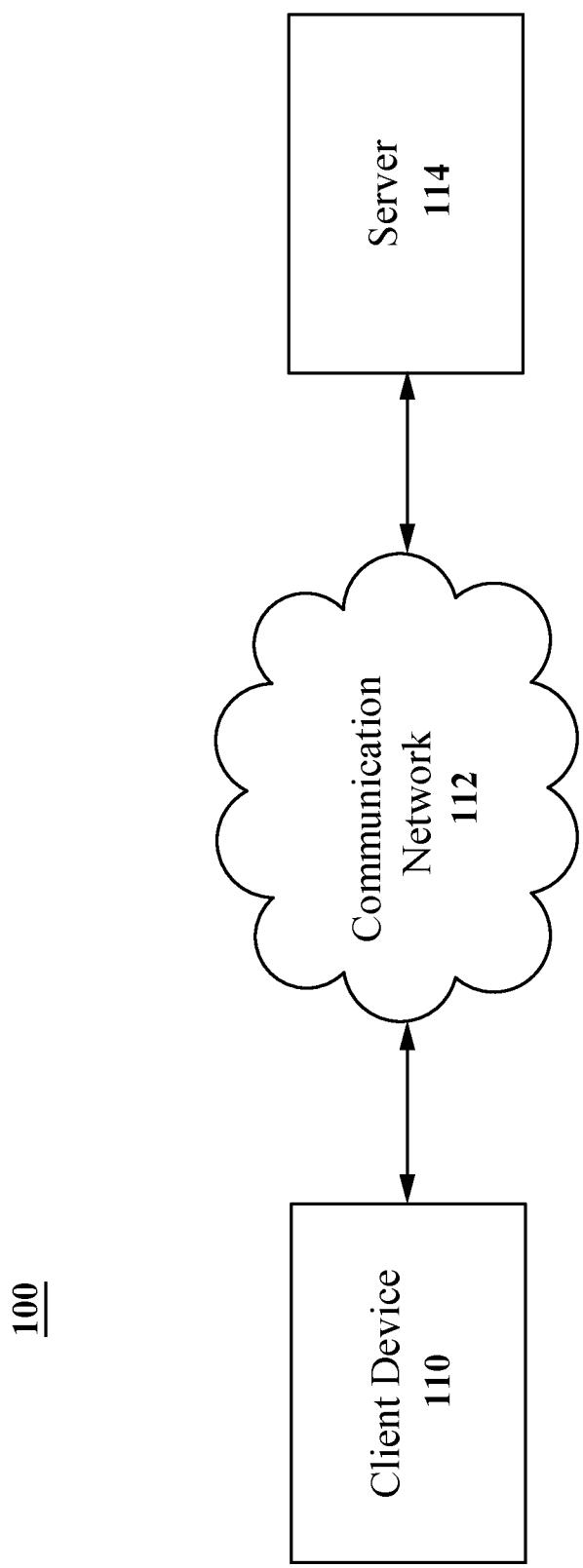
FIG. 1 depicts an environment for an intelligent caching system associated with an artificial intelligence (AI) training framework, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and method for an intelligent caching system associated with an artificial intelligence (AI) training framework.

Unless otherwise defined or indicated by context, all technical and scientific terms used herein have the same meaning as commonly understood by one of ordinary skill in the art to which the described embodiments appertain to.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present specification, the expression "data" includes data of any nature or kind whatsoever capable of being stored in a database. Thus, data includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the term "Training" may refer to a process of repeatedly feeding data into an AI training framework until the model can predict the correct outputs with a high accuracy. In one example, the data that is trained against comes in the form of labelled data. For example, if the data is a series of images, then the images will have labels to go with them (i.e., "dog", "cat", "tree", etc.). In another example, the data may be without any labels or at least partially labelled.

In the context of the present specification, the term "Tensor" is an object that stores the data for one object that is being training on. For example, a tensor may hold one jpg image. The tensor may contain meta-data that describes the object, as well as the data of the object itself.

In the context of the present specification, the term "Epoch" may refer to a single pass through the collection of data during a training run. For example, if the neural network/model is for classification of images, then to train it there may be millions of images to train against. In such a training run, each pass through the dataset (millions of images in this example) is called an epoch.

In the context of the present specification, the "AI Training Framework" may be a collection of software tools that may execute the task of reading the data, feeding it into the neural network/model for training, and driving the training logic to adjust the neural network/model until a certain accuracy is achieved. The AI Training Framework may provide operations that can change the data and present it in different ways. For example, the AI Training Framework may randomize the data, invoke transforms against the data like crop/resize images, filter certain data, and so forth.

In the AI Training Framework, a set of operations may be executed as AI training pipeline. To provide an analogy, an AI training pipeline may be like an assembly line at a car manufacturing plant where each worker is assigned a specific task to perform. Each worker takes some input, execute their task, and then pass the work on to the next worker. There may be a channel that connects each worker for passing input and output data to each worker. The AI training pipelines may be configured to operate in similar manner. The workers are often called "nodes" in the AI pipelines.

In the context of the present specification, the "Node" may be referred to as any processing element capable of processing an input data and generating output data, storing the input data and/or output data, communicating with other nodes, client devices, servers or the like. Without limiting the scope of the present disclosure, a node may include one or more processors, memory elements, and other required components.

Each node in the AI training pipeline may take some input, perform some operation/transformation on the data, and then produce some output for the next operator node to consume from. The AI training pipeline may provide good parallelism as the node at the end does not need to wait for the data. The data is constantly flowing through the operations being executed by parallel nodes in the AI training pipeline.

In the context of the present disclosure, "communication/communicate" between two nodes, a node and a processor/controller, a node and a server, a pipeline and a server, any two modules, any two software components, or any two hardware components, may be referred to as exchange, transfer, sending, receiving, sharing or the like of information, request, data, or the like without limiting the scope of present disclosure.

In the context of the present disclosure, the term "Sharding" may refer to the carving up of the data into smaller subsets, so that the smaller subsets can be operated over in parallel. For example, if there are 6 points of data that consists of $\{1,2,3,4,5,6\}$, and this is sharded into 3 different subsets of data: $\{1,2\}$, $\{3,4\}$, $\{5,6\}$, then each shard consists of two values. In distributed computing, a shard can be operated over by parallel processes.

In the context of the present disclosure, the term "Sampling" may refer to a process of selecting data from a data set. For example, if there are 10 elements to choose from, in one example, a random sampling may be executed and only 5 elements are randomly selected from 10 elements. In another example, a first n values are selected rather than random selection. There may be different ways to sample the data. In the context of the present disclosure, a selection may be deemed "random" if it is truly random or pseudorandom.

In the context of the present disclosure, the terms "Transform/transformation" and/or "Augmentations" may be referred to as operations that executed against the data and changing the original properties of the data. For example, in image processing, the non-limiting examples of transformation and/or augmentations may include flip, or rotate, or crop, or the like. An AI training framework typically provides the ability to inject augmentation and transform operations into the AI training pipeline.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and method for the intelligent caching system associated with the AI training framework.

In particular, FIG. 1 depicts an environment 100 for an intelligent caching system associated with an artificial intelligence (AI) training framework, in accordance with various embodiments of the present disclosure. The environment 100 may include multiple client devices 110 (for the purpose of simplicity only one client device 110 has been illustrated) located at different geographic locations that are configured to communicate with each other via a communication network 112 and a server 114. In certain embodiments, multiple client devices 110 may be associated with individual users (such as, users of personal computers, laptops, desktops, or the like) or a part of network (such as, client devices in an organization, etc.).

Figure 2A:
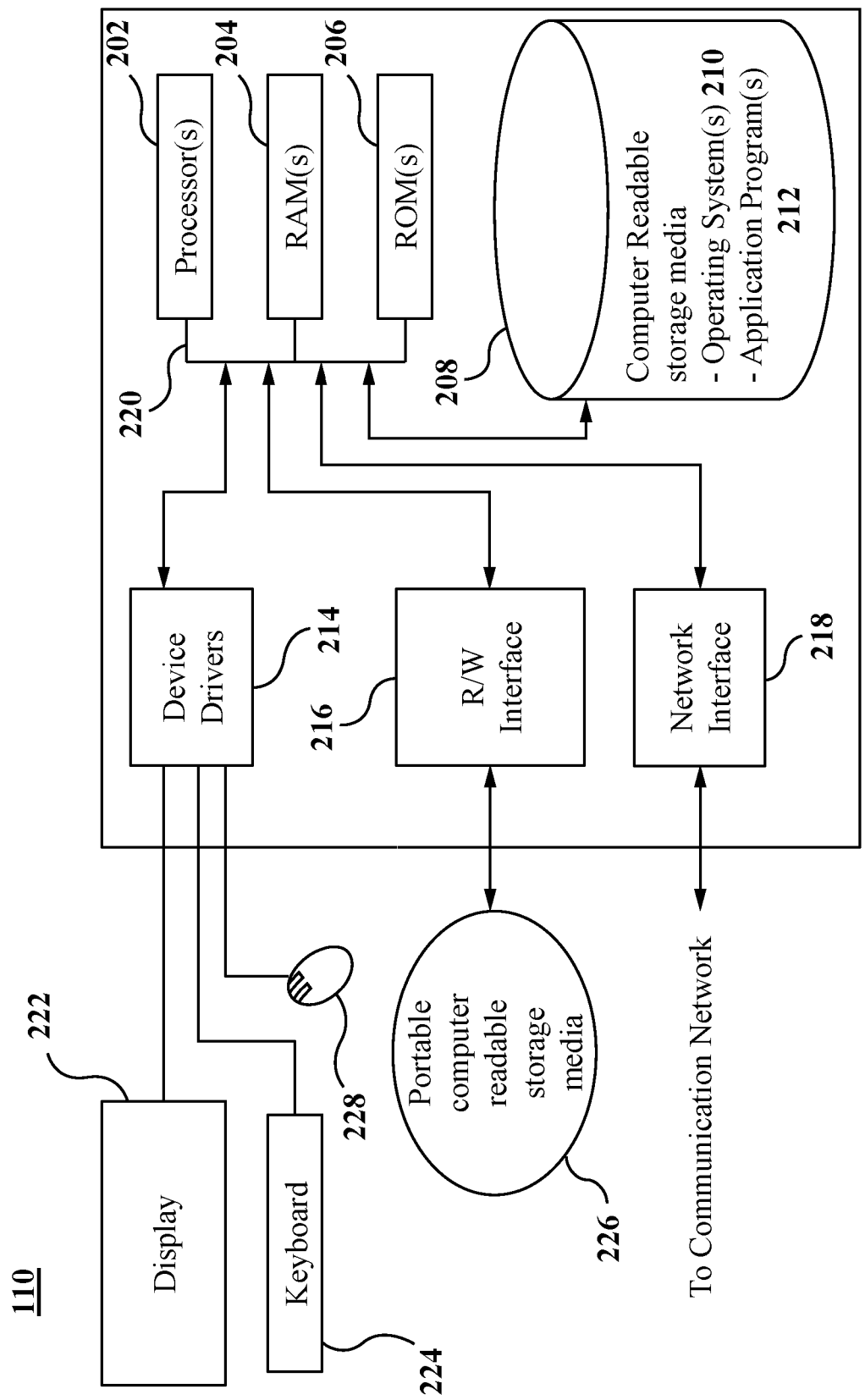
FIG. 2A depicts a high-level functional block diagram of a client device of the environment of FIG. 1, in accordance with various embodiments of the present disclosure.

FIG. 2A depicts a high-level block diagram of components of client device 110, in accordance with various embodiments of the present disclosure. It should be appreciated that FIG. 2A provides only an illustration of one implementation of client device 110 and does not imply any limitations with regard to the environments in which different embodiments may be implemented. Many modifications to the depicted environment can be done to implement client device 110 without departing from the principles presented herein. The client device 110 may be a server, a desktop computer, a laptop computer, or any device that may be configured to implement the present technology, as should be understood by a person skilled in the art.

As shown, client device 110 employs one or more processors 202, one or more computer-readable random access memories (RAMs) 204, one or more computer-readable read only memories (ROMs) 206, one or more computer-readable storage media 208, device drivers 214, a read/write (R/W) driver interface 216, a network interface 218, all interconnected over a communication fabric 220. The communication fabric 220 may be implemented by any architecture designed for passing data and/or control information between processors (such as microprocessors, communications and network processors, etc.), system memory, peripheral devices, and any other hardware components within a system.

One or more operating systems 210 and one or more application programs 212 are stored on one or more of computer-readable storage media 208 for execution by one or more of the processors 202 via one or more of respective RAMs 204 (which typically include a cache memory). In the illustrated embodiment, each of the computer-readable storage media 208 maybe a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 216 reads from and writes to one or more portable computer-readable storage media 226. The application programs 212 may be related to the intelligent caching system and stored on one or more of portable computer-readable storage media 226, read via the respective R/W driver interface 216 and loaded into the respective computer-readable storage media 208.

Further, network interface 218 may be based on a TCP/IP adapter card or wireless communication adapter (such as a 4G wireless communication adapter using OFDMA technology). The application programs 212 on client device 110 may be downloaded to client device 110 from an external computer or external storage device via a communication network (for example, the Internet, a local area network or other wide area network or wireless network) and network interface 218. From network interface 218, application programs 212 may be loaded onto the computer-readable storage media 208. The client device 110 may connect to routers, firewalls, switches, gateway computers and/or edge servers of the communication network using copper wires, optical fibers, wireless transmission, and the like.

The client device 110 may also include a display screen 222, a keyboard or keypad 224, and a computer mouse or touchpad 228. The device drivers 214 may interface with display screen 222 for imaging, with the keyboard or the keypad 224, with computer mouse or touchpad 228, and/or with display screen 222 (which may be a touch sensitive display) for alphanumeric character entry and user selections. The device drivers 214, R/W driver interface 216 and network interface 218 may comprise hardware and software (stored on the computer-readable storage media 208 and/or the ROM 206).

Figure 2B:
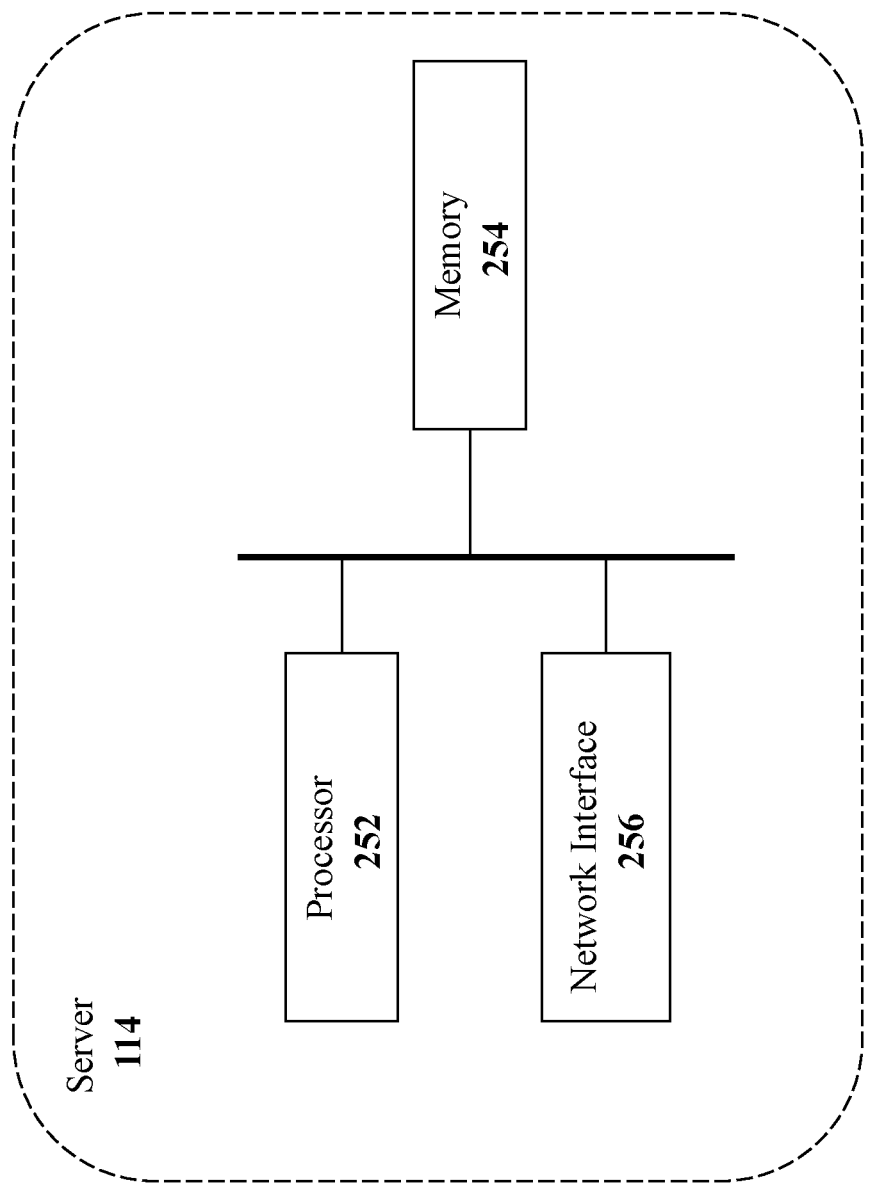
FIG. 2B depicts a high-level functional block diagram of the server of the environment of FIG. 1, in accordance with various embodiments of the present disclosure.

FIG. 2B depicts a high-level functional block diagram of server 114 of environment 100 of FIG. 1, in accordance with various embodiments of the present disclosure. In this embodiment, server 114 is a physical machine (e.g., a physical server) or virtual machine (e.g., a virtual server) that executes application programs to enable client devices 110 to communicate with server 114. The server 114 may include a processor 252, a memory 254, and a network interface 256. It is to be noted that the server 114 may include other components but have not been illustrated for the purpose of simplicity.

The processor 252 of server 114 may include one or more of a CPU, an accelerator, a microprocessor, a GPU, an ASIC, a FPGA, a dedicated logic circuitry, a dedicated artificial intelligence processor unit, or combinations thereof.

The memory 254 may include volatile memory (e.g., RAM) and non-volatile or non-transitory memory (e.g., a flash memory, magnetic storage, and/or a ROM). The non-transitory memory(ies) stores a platform that controls the overall operation of server 114. The platform, when executed by processor 252, implements application programs related to the intelligent caching system.

The network interface 256 may include one or more wireless transceivers configured for wireless communications with communication network 112, or one or more network adaptors configured for wired communications with communication network 112. In general, network interface 256 may be configured to correspond with the network architecture of that is used to implement a link for communications between server 114 and communication network 112. In certain embodiments, network interface 256 may be implemented in a similar manner as network interface 218 has been implemented.

It is to be noted that server 114 is shown as a standalone computer. However, the implementation of various other embodiments of the present disclosure may include any client-server model where client devices may run a client version of the application programs related to the intelligent caching system. Other examples of server 114 may include a distributed computing system that runs the server version of the application programs related to the intelligent caching system, a virtual machine (or virtual machines) instantiated by the infrastructure of a public or private cloud, or a cloud service provider that provides the application programs related to the intelligent caching system as a service (SaaS). Such implementations or any other similar implementation should not limit the scope of the present disclosure.

As previously discussed, to train a neural network/model, an AI training framework may execute various sets of operations as AI training pipelines. Further, to increase the speed of operations, the AI training framework may shard the data in a training data set. When the AI training pipeline is executed in parallel in a sharded mode, each AI training pipeline operates on some subset (shard) of the data. There are some operations like the randomization of the data (typically called shuffling) performed by the AI training framework where the desired behavior is to produce shuffled data from the entire dataset, rather than just the individual shard.

Figure 3A:
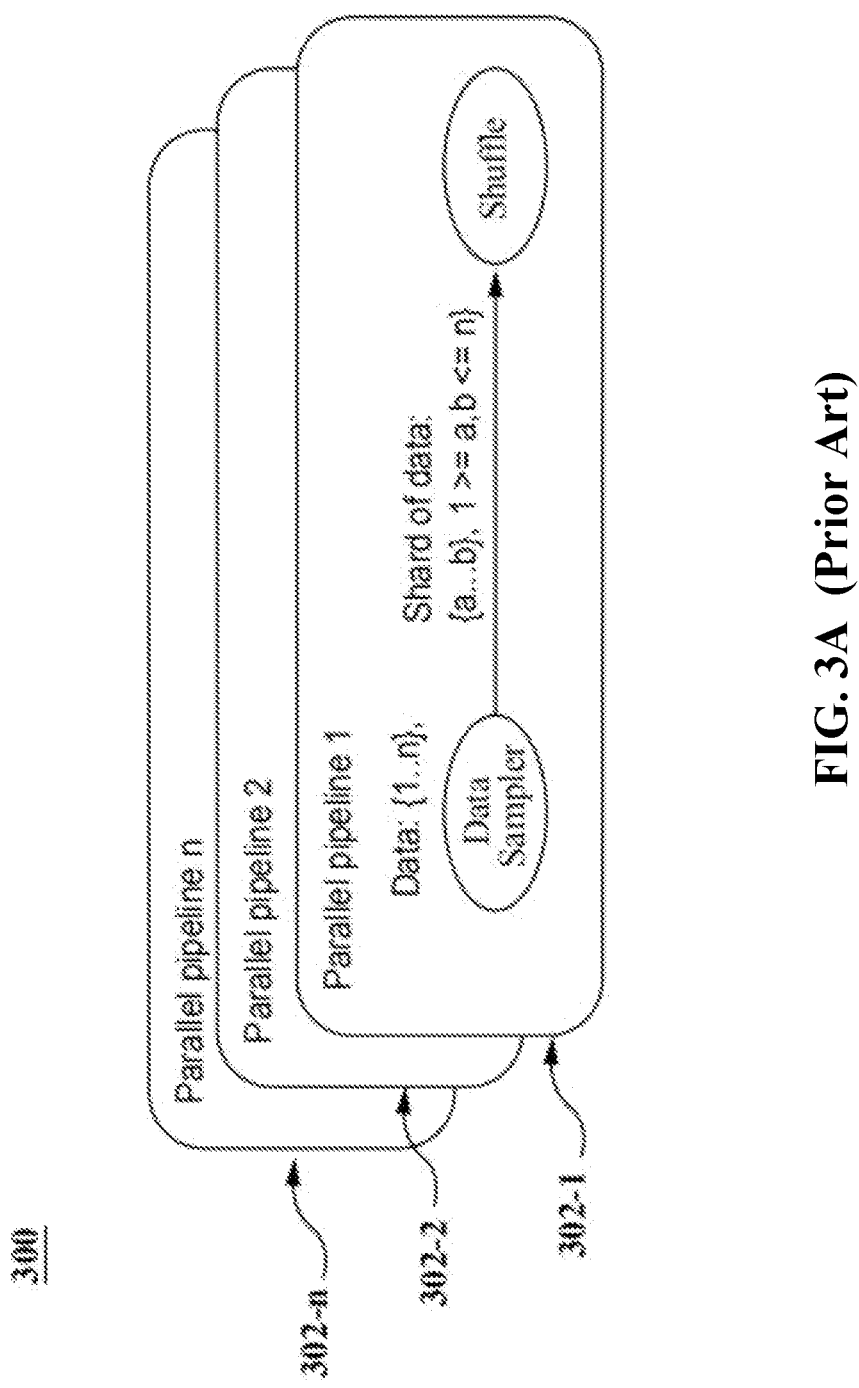
FIG. 3A (Prior Art) depicts a high-level block diagram of conventional n AI training pipelines.

FIG. 3A (Prior Art) depicts a typical high-level block diagram of n AI training pipelines 300. In typical techniques of sharding as illustrated by FIG. 3, each one of parallel pipelines 302-1, 302-2 . . . 302-*n* may operate on different shards of data throughout each epoch of training. In case the data is sharded prior to feeding the data to the parallel pipelines 302-1, 302-2 . . . 302-*n* and the shuffling operation is limited to only providing randomization against that given shard to a particular training pipeline only may not result in a desired global shuffle.

Figure 3B:
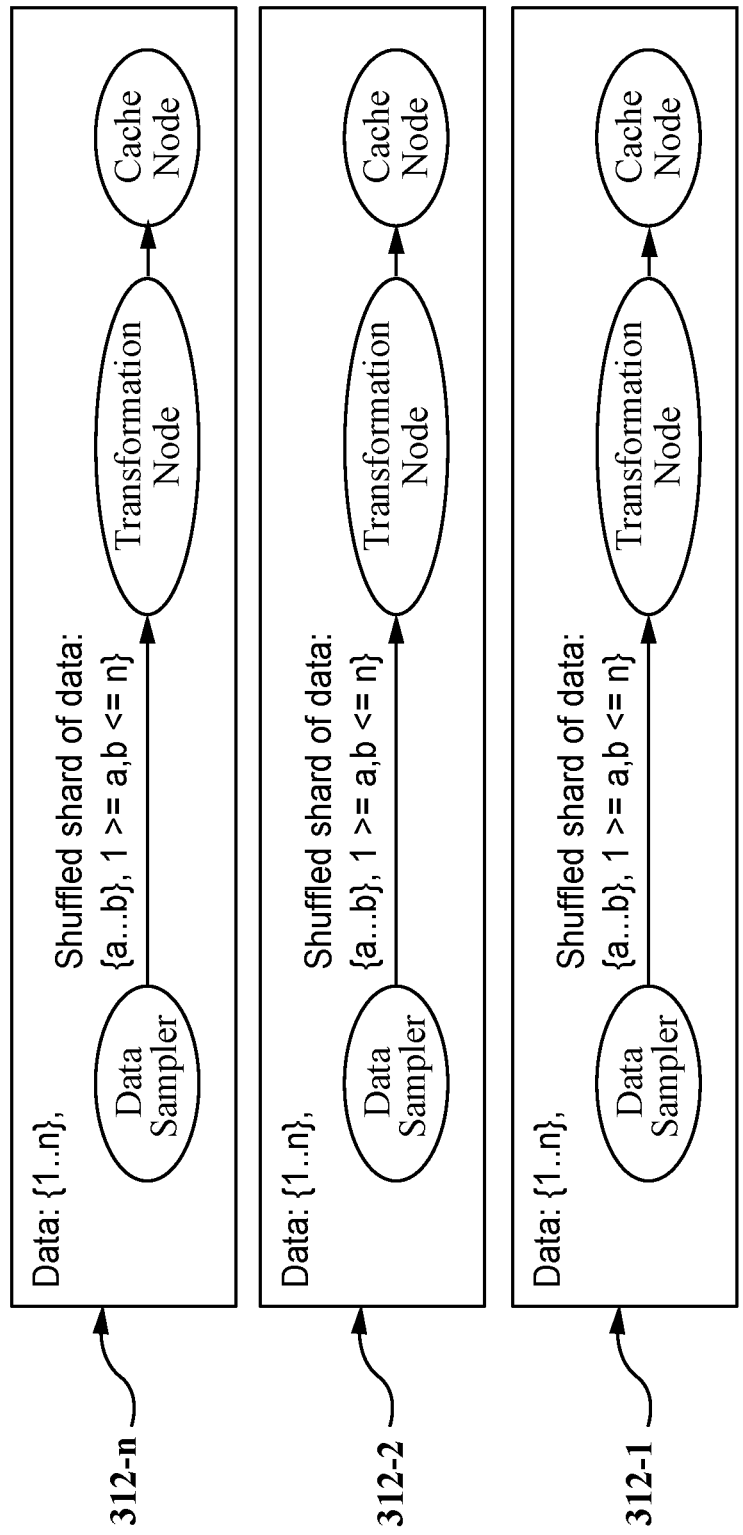
FIG. 3B (Prior Art) depicts another high-level block diagram of conventional n AI training pipelines.

In certain prior art solutions, in order to perform global shuffling, the shuffling operation is performed by a sampler as a part of sharding split so that the data sampler provides randomized shards of data by sampling randomly from the whole set to each AI training pipelines 312-1, 312-2 . . . 312-*n* as illustrated in FIG. 3B (Prior Art). In such a case, the data in a training data set is randomized and then sharded.

Although such techniques may provide a global shuffling of data while sharding in each epoch, any insertion of a caching operation after this negates the concept of having the source data globally accessible. Any node over this cache is only accessing that shard that was saved in the cache. Therefore, if a new epoch is run through this pipeline a different shard of data is selected due to global shuffling from the entire data set. In such a case, some of the data should result in cache hits and on cache hit data the transformation operations should not be performed. And, the data which were a cache miss, the transformation operations should be performed on such data.

By way of example, as illustrated by FIG. 3C (Prior Art), the data set has data {1, 2, 3, 4} and the data is sharded by randomly sampling two values from the overall set of data, providing a global shuffle. So, for the first epoch, suppose that the randomly sampled shard data {3,1} is provided to the AI training pipeline 312-1. The shard data {3,1} is transformed to {3',1'} by the transformation node and is written to a cache. The training consumer of the cache will get this data for training.

In the second epoch, as illustrated by FIG. 3D (Prior Art), suppose that the randomly sampled shard has data {2, 3} and is provided to the AI training pipeline 312-1. In various conventional techniques, the transformation node may transform the data {2, 3} to {2',3'}. Since in conventional techniques, a sampler sampling the data does not communicate with the cache that exists somewhere else in the AI training pipeline, the AI pipelines, as illustrated by FIGS. 3C and 3D, do not provide an efficient caching solution over the transformed data with global shuffling at the data sampler.

Figure 3E:
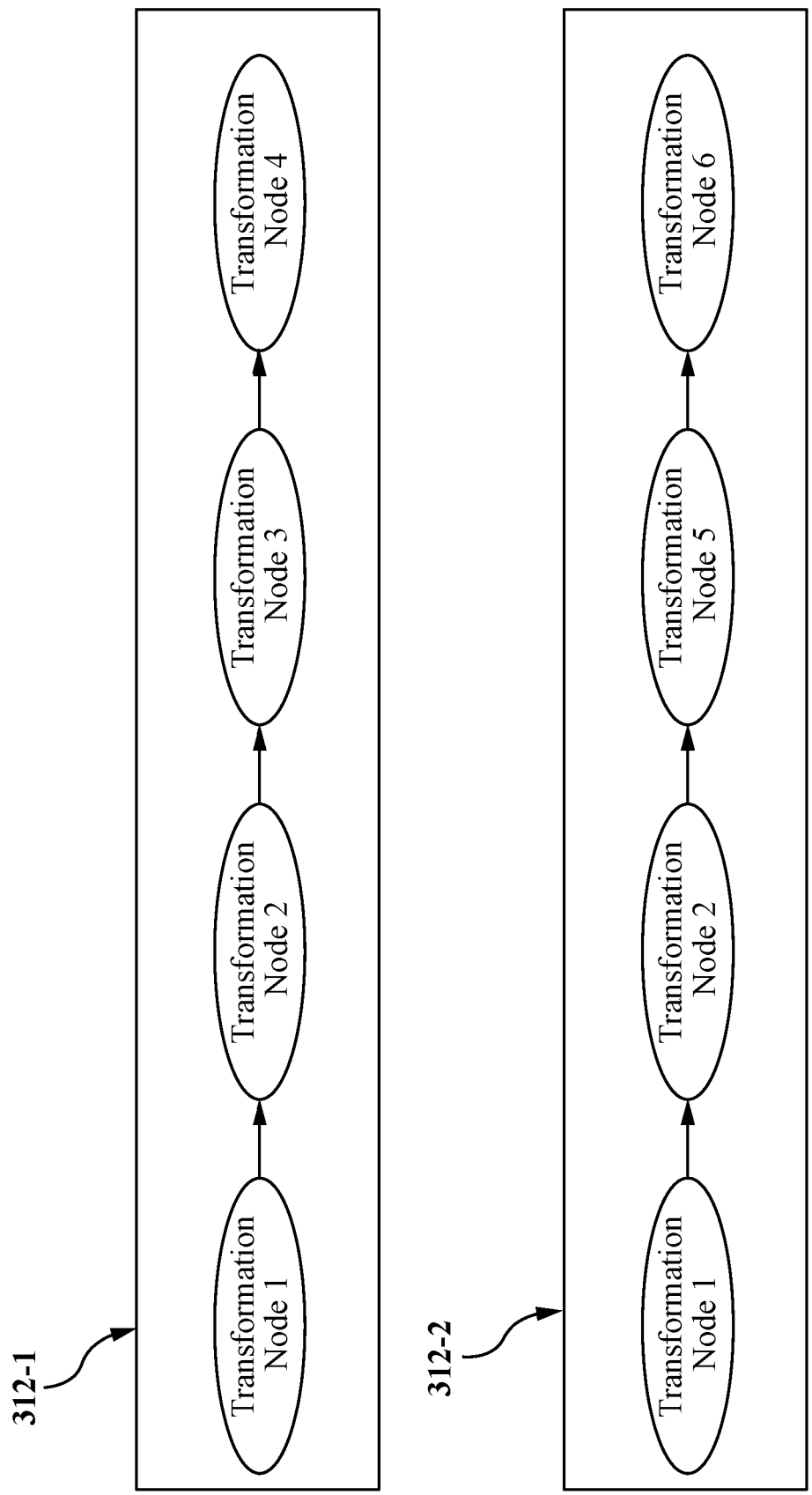

Moreover, if there are parallel pipelines executing concurrently, there may be cases where different AI training pipelines may share the same common subset of training operations over the same data, after which the training logic differs. FIG. 3E (Prior Art) illustrates a scenario where two different pipelines 312-1 and 312-2 with common subset of pipeline nodes transformation node 1 and transformation node 2. Although these are two different pipelines, transformation node 1 and transformation node 2, if operated on similar data may result in the same transformed data. It is to be noted that conventional techniques do not provide a solution to access cached data of two different pipelines, thereby creating a bottleneck in the efficient utilization of caching solutions.

With this said, there is an interest in developing an intelligent caching system that utilizes caching mechanism in AI training pipelines in an effective manner there by improving the performance of the AI training framework.

Figure 4:
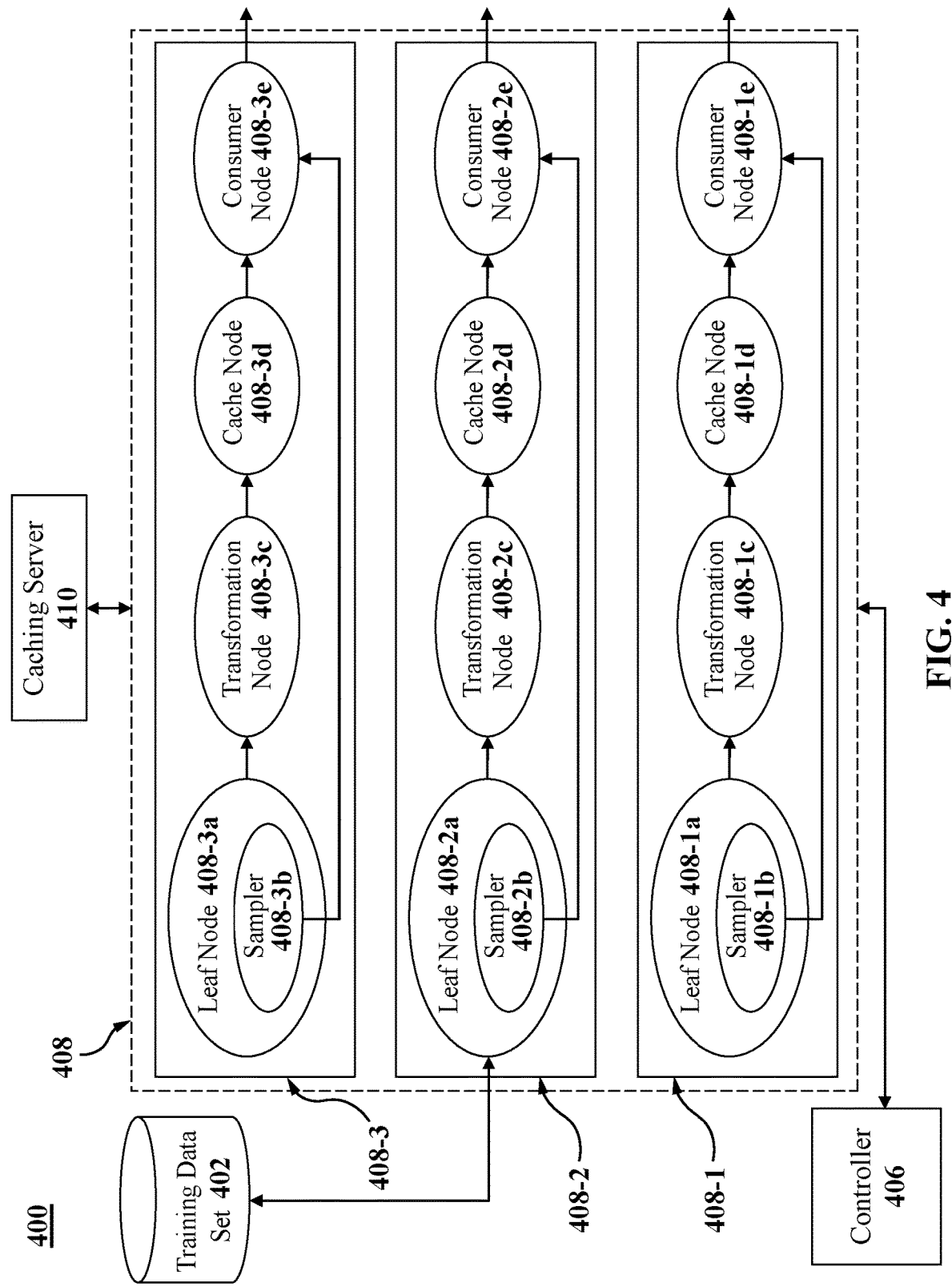
FIG. 4 illustrates a high-level functional block diagram of an intelligent caching system, in accordance with various embodiments of present disclosure.

FIG. 4 illustrates a high-level functional block diagram of an intelligent caching system 400, in accordance with various embodiments of present disclosure. As shown, intelligent caching system 400 may include a training data set 402, a controller 406, a set of AI training pipelines 408, and a caching server 410. It is contemplated that intelligent caching system 400 may include other components, elements, and/or modules but have not illustrated for the purpose of simplicity.

In certain embodiments, intelligent caching system 400, the associated modules, components, and pipelines may be implemented on client device 110. In other embodiments, intelligent caching system 400 and the associated modules, components, and pipelines may be implemented on server 114. In yet another embodiment, some of the modules, components, and pipelines of intelligent caching system 400 may be implemented on client device 110 while other modules, components, and pipelines may be implemented on server 114. It is contemplated that where intelligent caching system 400 has been implemented should not limit the scope present disclosure.

The training data set 402 may be arranged as a database and may comprise training data elements. The training data elements may include, but is not limited to, audiovisual (such as images, movies, sound records, presentations, etc.), data (such as location data, numerical data, etc.), text (opinions, comments, questions, messages, etc.) or the like. The type of training data elements should not limit the scope of present disclosure.

Further, the training data elements may have different formats. By way of example, the training data elements may exist in a directory structure like Path/dogs/poodle.jpg, Path/dogs/retriever.jpg, Path/cats/tabby.jpg, Path/cats/lion.jpg or the like. In another example, the training data elements may be encoded in an enormous binary file with a raw data and a label file such as Path/huge_data_file_with_many_images.dat and Path/label_info.dat.

The controller 406 may be configured to provide a neural network/model to set of AI training pipelines 408. The set of AI training pipelines 408 may be configured to train the neural network/model by processing the training data elements included in training data set 402. Also, controller 406 may be configured to control various operations of intelligent caching system 400. In certain embodiments, controller 406 may configure the various AI training pipelines in the set of AI training pipelines 408. The configuration of AI training pipelines may include specifying a functionality of each node in set of AI training pipelines 408.

By way of example, set of AI training pipelines 408 may include AI training pipelines 408-1, 408-2, and 408-3. The controller 406 may specify various nodes along with their functionalities in each AI training pipelines. The AI training pipeline 408-1 may include a leaf node 408-1*a*, a transformation node 408-1*c*, a cache node 408-1*d*, and a consumer node 408-1*e*. AI training pipeline 408-2 may include a leaf node 408-2*a*, a transformation node 408-2*c*, a cache node 408-2*d*, and a consumer node 408-2*e*, and AI training pipeline 408-3 may include a leaf node 408-3*a*, a transformation node 408-3*c*, a cache node 408-3*d*, and a consumer node 408-3*e*. Also, each of leaf nodes 408-1*a*, 408-2*a*, and 408-3*a* may include samplers 408-1*b*, 408-2*b*, and 408-3*b* respectively.

Without limiting the scope of present disclosure, in some embodiments, samplers 408-1*b*, 408-2*b*, and 408-3*b* may be software modules implemented on the processors associated with leaf nodes 408-1*a*, 408-2*a*, and 408-3*a* respectively to perform the functionalities as discussed in the present disclosure. In other non-limiting embodiments, samplers 408-1*b*, 408-2*b*, and 408-3*b* may be a part of leaf nodes 408-1*a*, 408-2*a*, and 408-3*a* respectively and may include one or more processors, memory elements, and other required components respectively to perform the functionalities as discussed in the present disclosure.

The controller 406 may create leaf nodes 408-1a, 408-2a, and 408-3a. The leaf nodes 408-1a, 408-2a, and 408-3a may be configured to communicate with training data set 402 in order to access the training data elements, to operate on the training data elements and read the training data elements from training data set 402 irrespective of data formats. In certain embodiments, leaf nodes 408-1a, 408-2a, and 408-3a may index the training data elements by generating data IDs corresponding to each training data element. The data IDs may act as pointers to the associated training data elements either stored in training data set 402 or in the cache memory of caching server 410 or even when the training data elements are in AI training pipelines (e.g., 408-1, 408-2, 408-3).

It will be appreciated that how the training data elements are being indexed should not limit the scope of present disclosure. For the purpose of simplicity, it is assumed that the training data elements are already indexed by leaf nodes 408-1a, 408-2a, and 408-3a, each training data element has a data ID and leaf nodes 408-1a, 408-2a, and 408-3a have an ability to perform a random access based on the data ID to fetch that particular training data element from training data set 402. It is to be noted that data IDs may be a language-independent label, sign or token that uniquely identifies the data stored in a memory (e.g., from training data set 402 in this case).

The controller 406 may assign sampler IDs to samplers 408-1b, 408-2b, and 408-3b and may provide samplers 408-1b, 408-2b, and 408-3b with the number of AI training pipelines (e.g., 3 in the above example). The samplers 408-1b, 408-2b, and 408-3b may have access to the data IDs of training data elements. In certain embodiments, samplers 408-1b, 408-2b, and 408-3b may receive data IDs from leaf nodes 408-1a, 408-2a, and 408-3a respectively.

Based on the assigned sampler IDs, data IDs and number of AI training pipelines, samplers 408-1b, 408-2b, and 408-3b may be configured to instruct leaf nodes 408-1a, 408-2a, and 408-3a to fetch a random subset of training data elements during each epoch. In so doing, each AI training pipeline in set of AI training pipelines 408 may operate on smaller subsets of training data elements (also referred to as sharded training data elements). Details of the functionality of samplers 408-1b, 408-2b, 408-3b will be discussed later in the present disclosure.

Further, controller 406 may define the functionality of transformation nodes 408-1c, 408-2c, and 408-3c in accordance with a machine learning algorithm to be trained on training data set 402. Also, controller 406 may specify nodes 408-1d, 408-2d, and 408-3d as cache nodes and 408-1e, 408-2e, and 408-3e as consumer nodes. Each of transformation nodes 408-1c, 408-2c, and 408-3c may be configured to operate on the sharded training data elements as provided by leaf nodes 408-1a, 408-2a, and 408-3a and transform the sharded training data elements in accordance with the associated transformations defined for each of transformation nodes 408-1c, 408-2c, and 408-3c.

In certain embodiments, cache nodes 408-1d, 408-2d, and 408-3d may be cache operator nodes configured to communicate with caching server 410 to store the data from transformation nodes 408-1c, 408-2c, and 408-3c, respectively, in a cache memory associated with caching server 410.

Basically, cache nodes 408-1d, 408-2d, and 408-3d may provide two main functions: 1) looking up and fetching data from the cache memory of caching server 410 and 2) writing new data to the cache memory of cache server 410. If cache 408-1d, 408-2d, and 408-3d perform a lookup on the data, but the data does not exist in the cache memory of caching server 410, it is to be referred to as a cache miss. That means intelligent caching system 400 may not take advantage of the cache because the data is not contained in the cache memory. In certain embodiments, caching node that communicates with caching server 410 may write the missing data into the cache memory so that the data may become available for future communications. Conversely, cache nodes 408-1d, 408-2d, and 408-3d perform a lookup on the data and the data exists in the cache memory of caching server 410, this is to be referred to as a cache hit and the requested data is returned to the cache node requesting the data. If a cache is in use, it is more optimal if the ratio of cache hits to cache misses is high, yielding better performance. In certain embodiments, the cache nodes 408-1d, 408-2d, and 408-3d may communicate with caching server 410 using data IDs of the training data elements.

It is to be noted that in various embodiments set of AI training pipelines may include n number of pipelines and each AI training pipeline may include n number of nodes and AI training pipelines 408-1, 408-2, and 408-3, leaf nodes 408-1a, 408-2a, 408-3a, sampler 408-1b, 408-2b, 408-3b, transformation nodes 408-1c, 408-2c, 408-3c, cache nodes 408-1d, 408-2d, 408-3d and consumer nodes 408-1e, 408-2e, 408-3e have been illustrated for the purpose of simplicity only.

The caching server 410 may be configured to interact with cache nodes 408-1d, 408-2d, 408-3d to cache the data requested by the cache nodes. In certain embodiments, where facilitating hardware is not an issue, caching server 410 may have enough cache memory to cache the all the training data elements present in training data set 402 after one epoch. However, where the caching server 410 has a limited cache memory, various memory optimization algorithms may be deployed on caching server 410. For example, if the size of the cache memory is limited, there may be some algorithms like an LRU algorithm (Least Recently Used) or MRU (Most Recently Used) or the like that can choose to evict older entries out of the cache memory to make room for new entries to be added. If a lookup request is issued against some data that had been evicted, then it would be a cache miss, requiring the data to be added to the cache again.

In certain embodiments, caching server 410 and/or cache nodes 408-1d, 408-2d, 408-3d may be configured to communicate with sampler 408-1b, 408-2b, 408-3b as well. The sampler 408-1b, 408-2b, 408-3b may be provided with the information (e.g., type of transformation) of transformation nodes 408-1a, 408-2a, and 408-3a.

As previously discussed, samplers 408-1b, 408-2b, 408-3b may be configured to randomly shard the training data elements in training data set 402 into smaller subsets of training data elements. During the first epoch (i.e., the training data elements is fed to set of AI training pipelines 408 for the very first time), there may not be any data present in cache memory of caching server 410. The samplers 408-1b, 408-2b, 408-3b may provide the sharded training data sets to AI training pipelines 408-1, 408-2, and 408-3. The transformation nodes 408-1a, 408-2a, and 408-3a may be configured to transform the sharded training data sets and the transformed sharded training data sets may be provided to cache nodes 408-1d, 408-2d, and 408-3d to be stored in cache memory of caching server 410.

The cache nodes 408-1d, 408-2d, and 408-3d may be configured to store the transformed sharded training data sets in the cache memory of caching server 410. To this end, in certain embodiments, cache nodes 408-1d, 408-2d, and 408-3d may communicate with caching server 410 and acquire a status of cache memory. Such status may include but is not limited to an available memory capacity of cache memory. Based on the available caching memory, cache nodes 408-1d, 408-2d, and 408-3d may transmit the transformed sharded training data sets to caching server 410.

In certain embodiments, if the caching memory is having enough memory to store all of the transformed sharded training data sets, cache nodes 408-1d, 408-2d, and 408-3d may transmit the transformed sharded training data sets to caching server 410. On the other hand, if the caching memory is not enough to store all of the transformed sharded training data sets, cache nodes 408-1d, 408-2d, and 408-3d may transmit a portion of data instead. Selection of data to be cached may be performed in a number of ways, such as, for example, initially during first epoch cache nodes 408-1d, 408-2d, and 408-3d may select the data in random manner. In other examples, the selection of data to be cached may be based on the probability of using the data in future epochs. The data with a high probability of being used in future epochs may be selected for caching. It is to be noted that how cache nodes 408-1d, 408-2d, and 408-3d select data to be cached should not limit the scope of present disclosure.

Moreover, in various embodiments, samplers 408-1b, 408-2b, 408-3b may be cache aware. Consider the following pipeline as example:

Leaf node→Transformation node (decode→resize→crop→rotate)→Cache node→Consumer node The above example illustrates five nodes in an AI training pipeline (e.g., AI training pipeline 408-1) going left to right, with a transformation operation executing a chain of image transformations performed by a transformation node (e.g., transformation node 408-1c) as second operation, a caching operator (e.g., cache node 408-1d) as third operation and a consumer operation performed by a consumer node (e.g., consumer node 408-1e) on the data from the caching operation.

Each of these operations may have a number of attributes and characteristics. Such as, for example, the leaf node knows how to read data from training data set 402 and may have fields like data set path, number of workers, sampler etc. The transformation operator has a chain of transforms and each transformation may have its own attributes. Such as, for example, decode: output format (RGB), resize: width, height, interpolation mode, crop: x1, y1, x2, y2 (coordinates x, y), rotate: angle and so on.

In order to make samplers 408-1b, 408-2b, 408-3b cache-aware, in certain embodiments, controller 406 may execute a cyclic redundancy code (CRC) algorithm to compute a checksum. In order to compute the checksum, controller 406 may traverse each AI training pipeline (e.g., 408-1) during initialization phases and cumulatively append the relevant attributes from each node from the leaf node (e.g., 408-1a) to the cache node (e.g., 408-1d) into a single temporary buffer as the nodes are visited in the AI training pipeline (e.g., AI training pipeline 408-1). The controller 406 may use the buffer as the input to the CRC algorithm and the checksum value (also referred to as cache ID) is generated. Then the buffer is freed and no longer required after this setup pass. The controller 406 may provide the cache ID associated with AI training pipelines 408-1, 408-2, and 408-3 to samplers 408-1b, 408-2b, and 408-3b respectively making them cache-aware.

It is to be noted that not all attributes are required to contribute in computing the cache IDs of the cache nodes (e.g., cache nodes 408-1d, 408-2d, 408-3d, etc.) for example, the number of workers in a node does not change the training data elements that this node produces, such attributes may not be required to be part of the attributes stored in the buffer. On the other hand, attributes like the dataset path and transformation details may contribute to change the properties of the training data elements and hence may be included in the buffer.

Thus, by virtue of CRC algorithm, controller 406 may provide a unique identification of AI training pipeline layouts and attributes that are feeding into the selected cached operation of the AI training pipeline (e.g., AI training pipeline 408-1). This allows any other AI training pipelines (e.g., 408-2, and 408-3) pipeline with the identically matched pipeline attributes to share the cache (even if other parts of the pipeline are different). Since, in certain embodiments, caching server 410 is external, cache writes, and lookups are global operations to any pipeline that is sharing the cache memory of caching server 410. Independently running shared-nothing pipelines that do not communicate with each other may collaborate using a common externally shared cache between them. It is to be noted that how controller 406 is executing the CRC algorithm should not limit the scope of present disclosure.

The advantage of such embodiments is that a cache memory is no longer a single system, single pipeline construct. If different systems are performing different trainings, however, using the same base data, then such systems may take advantage of each other's cached data.

Once, set of AI training pipelines 408 have been compiled by controller 406, samplers 408-1b, 408-2b, 408-3b may be configured to perform a cache-aware random sharding of training data set 402. As an example, let the training data elements in training data set 402 have been indexed as {1,2,3,4,5,6}. It will be appreciated that the training data index {1,2,3,4,5,6} is merely a representative example and have been represented for the purpose of simplicity without limiting the scope of present disclosure.

Without limiting the scope of present disclosure, the following pseudocode illustrates an example of a method performed by samplers 408-1b, 408-2b, 408-3b to produce shards of data IDs. Based on the shards of data IDs, leaf nodes 408-1a, 408-2a, and 408-3a may fetch the shards of training data elements from training data set 402 and supply the shards of training data elements to other nodes in AI training pipelines 408-1, 408-2, and 408-3.

```
list_of_possible_data_IDs = fetch_list(1 to total_num_Training_Data);
randomize(list_of_possible_Data_IDs);
num_data_IDs_to_produce = total_num_data_IDs / num_pipelines;
start_IDx = sampler_ID * num_data_IDs_to_produce
for (i = 0; i <num_Data_IDs_to_produce; i++)
{
data_ID_list.insert(list_of_possible_data_IDs [i + start_IDx]);
}
```

During the first epoch, controller 406 may provide sampler IDs to each of samplers 408-1b, 408-2b, and 408-3b. By way of example, the allocated IDs to samplers 408-1b, 408-2b, and 408-3b be 0, 1, and 2 respectively. Each sampler 408-1b, 408-2b, and 408-3b may execute the above-mentioned pseudocode. In so doing, samplers 408-1b, 408-2b, and 408-3b may produce shards of data IDs.

Consider the execution of above-mentioned pseudocode on sampler 408-1b. The sampler 408-1b may fetch all the data IDs from leaf node 408-1a. Let an example of the data IDs be {1, 2, 3, 4, 5, 6}, where each data ID corresponds to a training data element in training data set 402. The sampler 408-1b may randomize the positions of the data IDs resulting in randomized data IDs {2, 6, 1, 3, 5, 4}. The randomizing may include shuffling, mixing, rearranging or the like of the data IDs.

The sampler 408-1b may compute a number of data IDs per AI training pipeline. In the above example, the number of data IDs is 6 and number of AI training pipelines is 3. So, the number of data IDs per AI training pipeline is computed as 2. The sampler 408-1b may compute a reference point by multiplying the sampler ID with the number of data IDs per AI training pipeline. In the above example, the sampler ID is 0 and the number of data IDs per AI training pipeline is 2. So, the reference point is computed as 0.

Using the function "data_ID_list.insert(list_of_possible_data_IDs[i+start_IDx])", and varying the value of variable "i" from zero to the number of data IDs per AI training pipeline, sampler 408-1b may select a subset of randomized data IDs {2, 6, 1, 3, 5, 4} and produces subsets of data IDs. In the above example, sampler 408-1b produces a subset of data IDs {2, 6}.

In a similar manner, sampler 408-2b which has been assigned with sampler ID equals to 1 may produce a subset of data IDs {1, 3} and sampler 408-3b which has been assigned with sampler ID equals to 2 may produce a subset of data IDs {5, 4}.

The samplers 408-1b, 408-2b, and 408-3b may provide the data IDs {2, 6}, {1, 3}, and {5, 4} to leaf nodes 408-1a, 408-2a, and 408-3a respectively and instruct them to fetch the associated training data elements from training data set 402. In return, leaf nodes 408-1a, 408-2a, and 408-3a may fetch the training data elements associated with the data IDs {2, 6}, {1, 3}, and {5, 4}. Let the fetched training data elements are represented as sharded data sets {b, f}, {a, c}, and {e, d}. In is to be noted that this representation is merely for the purpose of simplicity. In practical situations the representations {b, f}, {a, c}, and {e, d} may be replaced by actual training data elements that may include image files, video files, audio files, or the like.

The leaf nodes 408-1a, 408-2a, and 408-3a may provide the sharded data sets {b, f}, {a, c}, and {e, d} to transformation nodes 408-1c, 408-2c, and 408-3c respectively. The transformation nodes 408-1c, 408-2c, and 408-3c may process the sharded data sets by applying the associated transformations and generate transformed data sets {b', f'}, {a', c'}, and {e', d'}. The transformation nodes 408-1c, 408-2c, and 408-3c may provide transformed data sets {b', f'}, {a', c'}, and {e', d'} to cache nodes 408-1d, 408-2d, 408-3d.

The cache nodes 408-1d, 408-2d, 408-3d may communicate with caching server to cache the transformed data set. In so doing, cache nodes 408-1d, 408-2d, 408-3d may request a cache memory capacity status from caching server 410. In case caching server 410 has enough memory, cache nodes 408-1d, 408-2d, 408-3d may send the transformed data sets {b', f'}, {a', c'}, and {e', d'} to caching server 410 to be stored in cache memory. On the other hand, if caching server 410 does not have enough cache memory, cache nodes 408-1d, 408-2d, 408-3d may select at least a portion of the transformed data sets {b', f'}, {a', c'}, and {e', d'} to be stored in cache memory. In some examples, the selection may be a random selection while in other examples the selection may be based on the probability of using the transformed data in future epochs. It is to be noted that the selection criteria should not limit the scope of present disclosure.

In the above example, let caching server 410 is not having enough cache memory. To this end, cache node 408-1d may select {b'}, cache node 408-2d may select {a'}, and cache node 408-3d may select {e' } and send the data to caching server 410.

During second epoch, samplers 408-1b, 408-2b, and 408-3b may repeat the above process to produce different shards of data IDs by again randomizing the data IDs {1, 2, 3, 4, 5, 6}. By executing the pseudocode disused above, let samplers 408-1b, 408-2b, and 408-3b produces subset of data IDs {1, 2}, {6, 4}, and {3, 5}. The leaf nodes 408-1a, 408-2a, and 408-3a may fetch the training data elements associated with the subset of data IDs {1, 2}, {6, 4}, and {3, 5} represented as {a, b}, {f, d}, {c, e}. In conventional techniques, during each epoch all the sharded data sets are passed through the AI training pipelines as the conventional samplers performing global shuffling are not aware of what data is being cached. To this end, the conventional transformation nodes may process all data again even though at least a portion of the data may have already available in cache resulting in system overhead.

With this said, in intelligent caching system 400 provides an alternative to conventional technique to reduce system overhead. In particular, during second epoch or any epoch after the first epoch, samplers 408-1b, 408-2b, and 408-3b may communicate with caching server 410 to determine which transformed data is available in cache memory using the cache IDs and the subsets of data IDs to fetch the training data elements previously cached by cache nodes 408-1d, 408-2d, and 408-3d respectively. In return, caching server 410 may provide at least a portion of the training data elements present in cache memory of caching server 410 corresponding to the subsets of data IDs In the above example, caching server 410 may provide samplers 408-1b, 408-2b, and 408-3b respectively a portion of the transformed data {a'}, {b'}, and {e'} already available in the cache memory corresponding to the subset of randomized data IDs {1, 2} and {5}. In this manner, samplers 408-1b, 408-2b, and 408-3b may determine which data need to flow through the AI training pipelines 408-1, 408-2, and 408-3, and which data can be bypassed. Since, {a', b' } already exist in the cache memory, to this end, only samplers 408-2b, and 408-3b may instruct leaf nodes 408-2a and 408-3a to fetch the remaining training data elements that were a cache miss. The leaf nodes 408-2a and 408-3a may fetch {f, d} and {c} from training data set 402. The leaf nodes 408-2a and 408-3a may provide the remaining training data elements {f, d} and {c} to transformation nodes 408-2c and 408-3c respectively for further processing in order to train the neural network/model.

The transformation nodes 408-2c and 408-3c may process only the sharded data sets {f, d} and {c} respectively instead of operating over the bigger data sets. The transformation nodes 408-2c and 408-3c may apply the associated transformations and generate transformed data sets {f', d'} and {c'}.

In addition, in certain embodiments, samplers 408-1b, 408-2b, and 408-3b may forward (send or communicate or transmit or provide or supply or the like) the portion of training data elements received from the caching server 410 as cache hit data i.e., {a', b'} and {e'} to consumer nodes 408-1e and 408-3e respectively for further processing.

In some embodiments, the cache nodes 408-1d, 408-2d and 408-3d may update the cache memory of caching server 410 with the transformed training data elements that were a cache miss by replacing some previously cached transformed training data elements.

Thus, by virtue of cache-aware samplers 408-1b, 408-2b, and 408-3b, intelligent caching system 400 may facilitate global operations like global shuffling in an efficient manner. Also, intelligent caching system 400 allows to bypass at least a portion of a training data elements to be processed by AI training pipelines 408-1, 408-2, and 408-3 by cache-aware sharding yielding performance gains by avoiding repeated operations over the same set of data.

Further, in some embodiments where if the two AI training pipelines are performing two different trainings however, using the same base data i.e., training data set 402, and at least a portion of the two pipelines is same then such AI training pipelines may take advantage of each other's cached data.

By way of example, if AI training pipeline 408-1 and AI training pipeline 408-2 are performing two different trainings in a manner that consumer node 408-1e has a different functionality from consumer node 408-2e. However, AI training pipelines 408-1 and 408-2 are operating on same training data set 402, transformation nodes 408-1c and 408-2c are performing similar transformations and cache nodes 408-1d and 408-2d are caching the transformed training data elements.

As previously discussed, controller 406 may compute cache IDs for each AI training pipelines and provide the respective cache IDs to the samplers of each AI training pipelines. In the above example, where AI training pipeline 408-1 and AI training pipeline 408-2 are performing two different trainings, sampler 408-1b and sampler 408-2b may communicate with caching server 410 using their respective cache IDs. Since, cache IDs from both samplers 408-1b and 408-2b are same AI training pipeline 408-1 and AI training pipeline 408-2 may share a same allocated cache memory in caching server 410 and may access (e.g., be able to read or write or modify or use) cached data of each other. In so doing, if some of the training data elements are being processed by AI training pipeline 408-1 has been cached, it may be accessed by AI training pipeline 408-2 and vice versa.

It is to be noted that, in above examples, same controller is computing the cache IDs for different pipelines, however, it will be appreciated that if AI training pipeline 408-1 and AI training pipeline 408-2 are performing two different trainings, these pipelines may be controlled by different controllers. How a cache ID is computed and is supplied to an AI training pipeline should not limit the scope of present disclosure.

Figure 5:
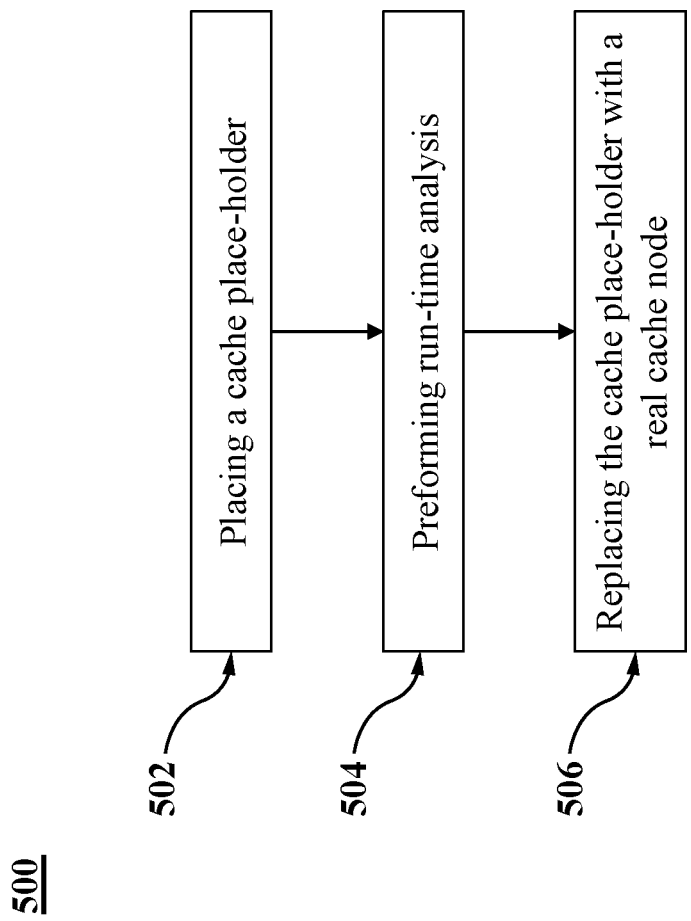
FIG. 5 depicts a flowchart representing a process corresponding to a method for placing cache nodes implemented on intelligent caching system, in accordance with various embodiments of the present disclosure.

In order to further improve the performance of intelligent caching system 400, in certain embodiments, the injection of cache nodes 408-1d, 408-2d, and 408-3d may be performed in accordance with a process 500 (as depicted by FIG. 5) corresponding to a method for placing cache nodes implemented on intelligent caching system 400, in accordance with various embodiments of present disclosure.

In conventional techniques of the injection of cache nodes may include a manual operation. It is to be noted that the different position of a cache node in an AI training pipeline may yield different performance results and a manual positioning of cache nodes may not result in an efficient injection and may affect the over all performance in terms of resource utilization. Thus, there is an interest in addressing how to decide where and when to inject a cache node into the AI training pipeline that will result in an efficient system performance.

With this said, process 500 provides a method for placing cache nodes based on determining a position that may result in an increased performance of intelligent caching system 400. The process 500 commences at step 502 where controller 406 places cache place-holders in AI training pipeline.

Figure 6:
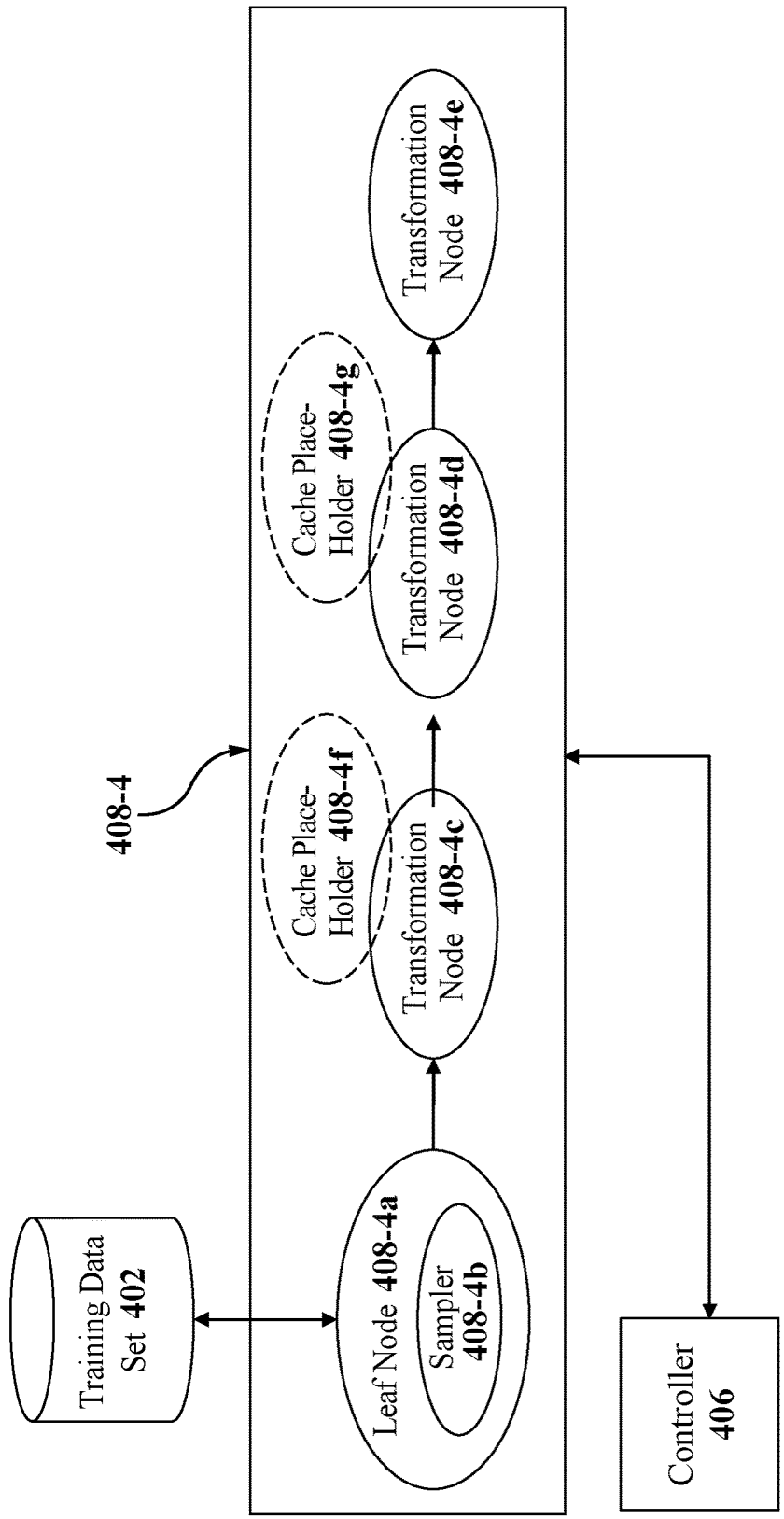
FIG. 6 illustrates another high-level functional block diagram of the intelligent caching system, in accordance with various embodiments of present disclosure.

FIG. 6 illustrates another high-level functional block diagram of a portion of intelligent caching system 400, in accordance with various embodiments of present disclosure. As shown, intelligent caching system 400 includes an AI training pipeline 408-4. The controller 406 may define and initialize various nodes in AI training pipeline 408-4. Such as, for example, controller 406 may define and initialize node 408-4a as a leaf node including a sampler 408-4b. Further, controller 406 may define and initialize nodes 408-4c, 408-4d, 408-4e as transformation nodes. Once the nodes in AI training pipeline 408-4 have been defined and initialized, controller 406 may place one or more cache place-holders 408-4f and 408-4g (also referred to as non-functional cache nodes in a sense that cache place-holders 408-4f and 408-4g may not perform any function of a cache node unless they have been replaced by a functional cache) in accordance with a set of rules that may satisfy compile-time (AI training pipeline compilation) analysis requirements of AI training pipeline 408-4 in terms of resource utilization.

In rule-based analysis, controller 406 may examine the transformation operators of transformations nodes 408-4c, 408-4d, 408-4e themselves, as well as the cache memory available, and then determine a potential cache position if the set of rules have been satisfied. The cache position can be a place-holders (e.g., cache place-holders 408-4f and 408-4g) only for the first iteration to start i.e., cache place-holders 408-4f and 408-4g may act as non-functional caches nodes such that they don't cache the transformed data. Rather the performance of AI training pipeline may be evaluated by controller 406 as if cache place-holders 408-4f and 408-4g were actual cache nodes A non-limiting example of set of rules may include, a transformation node (e.g., transformation node 408-4c) executing transformations (such as, mapping of transforming kernel functions to each tensor of the training data elements) is often computer-straining operation. Such as, for example, a "decode" operation that takes an image in its compressed format like jpg, may decode it into its RGB format (a rank 3 tensor), growing the data in size. A growth factor constant for decode may estimate the result size, and when used in a rule with system memory and disk space, controller 406 may decide if a cache node after decoding operation may yield benefit. If the data size can fit in 50% of the system memory, then the rule may be considered to be satisfied for cache placement.

Another non-limiting example of set of rules may include, if a transformation node (e.g., transformation node 408-4c) randomly samples x values of training data elements. The controller 406 may compute a sample percentage representing the what percentage sample x are of number of training data elements in training data set 402. The controller 406 may decide if a cache node after sampling operation may yield benefit, if the sample percentage is greater than certain required percentage (e.g., greater than 40%). By way of example, if a transformation node (e.g., transformation node 408-4c) selects 10,000 training data elements from the overall training data set 402 consisting of 1.5 million training data elements.

That is, during each epoch the transformation node (e.g., transformation node 408-4c) may randomly select 10,000 training data elements, but that is less than 1% of the overall amount of training data elements. As such, the probability that the transformation node (e.g., transformation node 408-

4c) may fetch the same training data element that was selected in a previous epoch is very low which means the chances of getting a cache hit are not likely. There will be frequent cache misses, which reduce any benefit of adding a cache node after this sampling operation as the set of rules were not satisfied.

Thus, controller 406 may place cache place-holders 408-4f and 408-4g in accordance with a position in AI training pipeline 408-4 satisfying the set of rules during compilation of AI training pipeline 408. It is to be noted that the set of rules discussed above are examples and in various embodiments other set of rules may be used while placing cache place-holders 408-4f and 408-4g without limiting the scope of present disclosure.

Returning to FIG. 5, once controller 406 has placed cache place-holders 408-4f and 408-4g during AI training pipeline compile-time, process 500 proceeds to step 504. At step 504, controller 406 may perform a run-time analysis of the cache place-holders 408-4f and 408-4g placed in AI training pipeline 408-4 by passing the training data elements and computing the run-time metrics at cache place-holders 408-4f and 408-4g.

In particular, controller 406 (as illustrated in FIG. 6) may collect run-time data collection of resource utilization (such as memory usage, CPU/GPU usage, etc.) at the cache place-holders 408-4f and 408-4g. The controller 406 may collect run-time metrics about the channels between transformation nodes 408-4c, 408-4d, and 408-4e. Such as, for example, if one transformation operation performed by one transformation node (e.g., 408-4c) is executing slowly, then the data stream that is feeding into the transformation node (e.g., 408-4c) may experience delays. Wait-time analysis and data queue lengths may provide an indication of which operators/transformation nodes in AI training pipeline 408-4 are bottlenecks. In a similar manner, controller 406 may observe real memory usage and CPU metrics. It is to be noted that run-time metrices discussed above in regards of the run-time analysis are merely examples and in various embodiments controller 406 may observe or compute other run-time metrics without limiting the scope of present disclosure.

Finally, process 500 proceed to step 506 after performing the run-time analysis by controller 406. At step 506, based on compile-time and run-time analysis, controller 506 may evaluate the performance of cache place-holders 408-1f and 408-1g. Further, controller 406-6 may replace a cache place-holder having a better performance in terms of resource utilization (such as memory usage, CPU/GPU usage, etc.) with a real cache node and removing all other cache-place holders if the performance is not satisfactory.

Thus, by virtue of placing cache nodes in a manner discussed above will result in an improved performance of AI training pipelines and reduced CPU usage. Also, sections of AI training pipelines below the cache nodes on subsequent epochs for the same data can be bypassed by reading the cache memory. So, requirement of performing compute-heavy tasks again is avoided.

Figure 7:
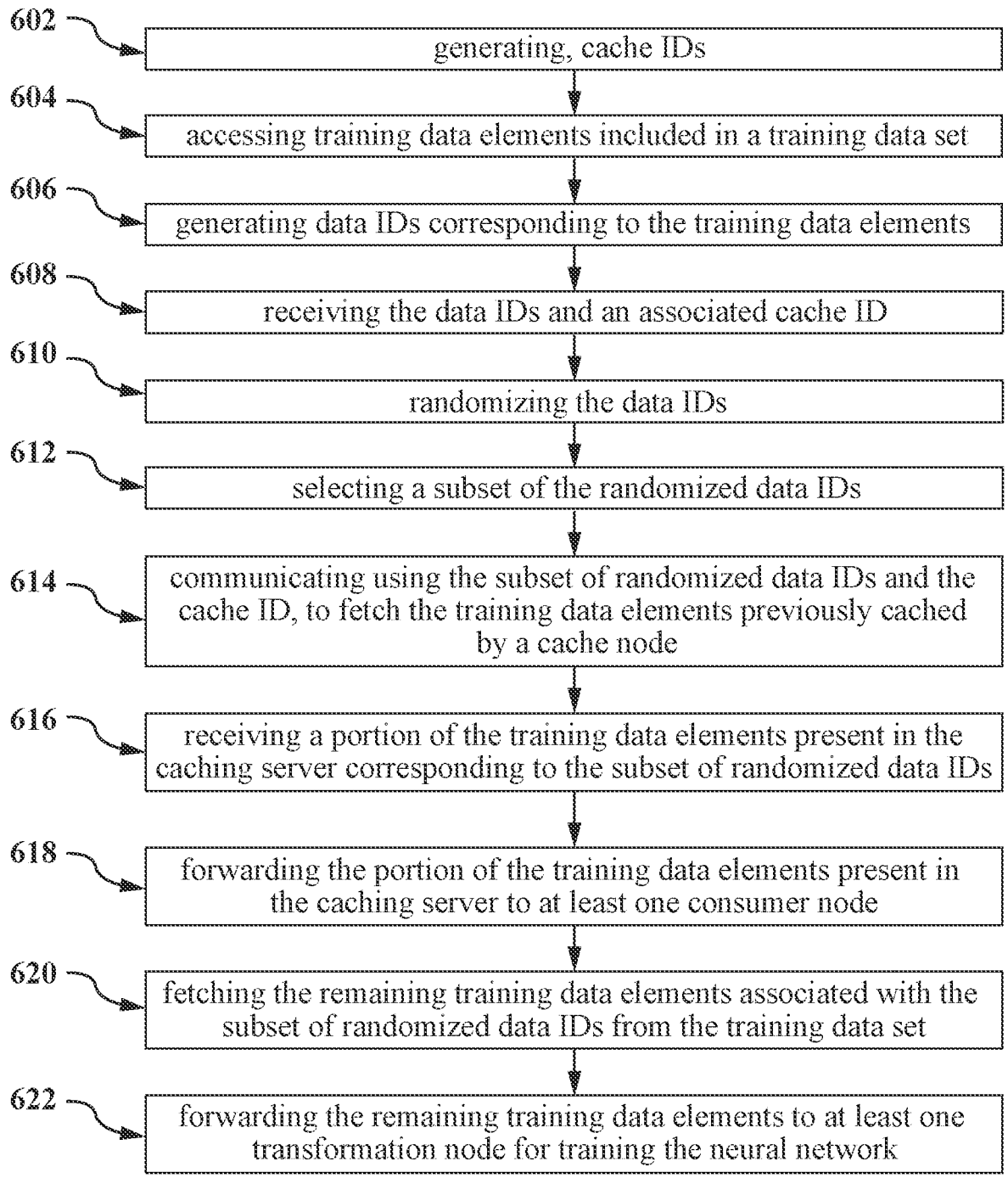
FIG. 7 depicts a flowchart representing a process corresponding to a method for intelligent caching implemented on intelligent caching system, in accordance with various embodiments of the present disclosure.

FIG. 7 depicts a flowchart representing a process 600 corresponding to a method for intelligent caching implemented on intelligent caching system, in accordance with various embodiments of the present disclosure.

The process 600 commences at step 602, where the controller 406 generates cache IDs for each of a plurality of AI training pipelines. As noted above, controller 406 generates the cache IDs by executing a cyclic redundancy code (CRC) algorithm for AI training pipelines 408-1, 408-2, and 408-3 and computing the associated checksums.

The process 600 moves to step 604, where a leaf node (e.g., 408-1a, 408-2a, and 408-3a) accesses training data elements included in a training data set 402. As previously noted, leaf nodes 408-1a, 408-2a, and 408-3a may be configured to communicate with training data set 402 in order to access the training data elements, to operate on the training data elements and read the training data elements from training data set 402 irrespective of data formats.

The process 600 proceeds to step 606, where the leaf node (e.g., 408-1a, 408-2a, and 408-3a) generates data IDs corresponding to the training data elements. As previously discussed, leaf nodes 408-1a, 408-2a, and 408-3a may index the training data elements by generating data IDs corresponding to each training data element.

The process 600 advances to step 608, where a sampler (e.g., 408-1b, 408-2b, and 408-3b) receives the data IDs and an associated cache ID. As noted above, samplers 408-1b, 408-2b, and 408-3b may receive data IDs from leaf nodes 408-1a, 408-2a, and 408-3a respectively, controller 406 may provide the cache ID associated with AI training pipelines 408-1, 408-2, and 408-3 to samplers 408-1b, 408-2b, and 408-3b respectively making them cache-aware. By the term "an associated cache ID", it may be referred to as the cache ID of an AI training pipeline where a particular sampler resides. For example, sampler 408-1b may receive a cache ID associated with AI training pipeline 408-1.

The process 600 advances to step 610, where the sampler (e.g., 408-1b, 408-2b, and 408-3b) randomizes the data IDs. As noted previously, sampler 408-1b may randomize the positions of the data IDs resulting in randomized data IDs {2, 6, 1, 3, 5, 4}. The randomizing may include shuffling, mixing, rearranging or the like of the data IDs.

The process 600 moves to step 612, where the sampler (e.g., 408-1b, 408-2b, and 408-3b) selects a subset of the randomized data IDs. As discussed above, sampler 408-1b may select a subset of randomized data IDs {2, 6, 1, 3, 5, 4} and produces subsets of data IDs. In an example, sampler 408-1b produces a subset of data IDs {2, 6}.

The process 600 advances to step 614, where, the sampler (e.g., 408-1b, 408-2b, and 408-3b) communicates with a caching server 410, using the subset of randomized data IDs and the cache ID, to fetch the training data elements previously cached by a cache node. As previously noted, samplers 408-1b, 408-2b, and 408-3b may communicate with caching server 410 to determine which transformed data is available in cache memory using the cache IDs and the subsets of data IDs to fetch the training data elements previously cached by cache nodes 408-1d, 408-2d, and 408-3d respectively.

The process moves to step 616, where the sampler (e.g., 408-1b, 408-2b, and 408-3b) receives a portion of the training data elements present in the caching server corresponding to the subset of randomized data IDs from controller 406. As previously discussed, caching server 410 may provide samplers 408-1b, 408-2b, and 408-3b respectively a portion of the transformed data {a'}, {b'}, and {e'} already available in the cache memory corresponding to the subset of randomized data IDs {1, 2} and {5}.

The process proceeds to step 618, where the sampler (e.g., 408-1b, 408-2b, and 408-3b) forwards the portion of the training data elements present in the caching server to at least one consumer node. As noted above, samplers 408-1b, 408-2b, and 408-3b may forward the portion of training data elements received from the caching server 410 as cache hit data i.e., {a', b'} and {e'} to consumer nodes 408-1e and 408-3e respectively for further processing.

The process proceeds to step 620, where the leaf node (e.g., 408-1a, 408-2a, and 408-3a) fetches the remaining training data elements associated with the subset of randomized data IDs from the training data set 402. As noted previously, samplers 408-2b, and 408-3b may instruct leaf nodes 408-2a and 408-3a to fetch the remaining training data elements that were a cache miss and leaf nodes 408-2a and 408-3a may fetch {f, d} and {c} from training data set 402.

Finally, process 600 moves to step 622, where the leaf node (e.g., 408-1a, 408-2a, and 408-3a) forwards the remaining training data elements to at least one transformation node for training the neural network. As discussed above, leaf nodes 408-2a and 408-3a may provide the remaining training data elements {f, d} and {c} to transformation nodes 408-2c and 408-3c respectively for further processing in order to train the neural network/model.

It is to be understood that the operations and functionality of environment 100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A system comprising:
a plurality of artificial intelligence (AI) training pipelines training a neural network, each AI training pipeline of the plurality of AI training pipelines including a plurality of nodes and a leaf node containing a sampler;
a training data set including training data elements;
a controller configured to generate cache IDs for each AI training pipeline of the plurality of AI training pipelines, wherein the controller generates a cache ID for the each AI training pipeline of the plurality of AI training pipelines by:
determining a set of attributes of nodes of the AI training pipeline, wherein the set of attributes are attributes of transformations applied by the nodes of the AI training pipeline,
inputting the set of attributes to a cyclic redundancy code (CRC) algorithm, and
outputting, by the CRC algorithm and based on the set of attributes, the cache ID;
the leaf node is configured to communicate with the training data set to access the training data elements and generate data identities (IDs) corresponding to the training data elements;
the sampler is configured to:
receive the data IDs from an associated leaf node and an associated cache ID from the controller,
randomize the data IDs,
select a subset of the randomized data IDs,
communicate with a caching server using the subset of randomized data IDs and the cache ID to fetch the training data elements previously cached by a cache node,
receive, from the caching server, a portion of the training data elements present in the caching server corresponding to the subset of randomized data IDs and the cache ID,
forward the portion of the training data elements present in the caching server to at least one consumer node, and
instruct the leaf node to fetch training data elements which were not present in the caching server from the training data set; and
the leaf node is further configured to:
fetch the training data elements which were not present in the caching server from the training data set; and
forward the training data elements which were not present in the caching server to at least one transformation node for training the neural network.

2. The system of claim 1, wherein two AI training pipelines having a same cache ID share a same allocated cache memory in the caching server.

3. The system of claim 1, wherein determining the set of attributes of nodes of the AI training pipeline comprises:
appending attributes from each node of the AI training pipeline to a temporary buffer; and
inputting the temporary buffer to the CRC algorithm.

4. The system of claim 1, wherein the set of attributes comprise attributes that affect values of training data elements generated by the AI training pipeline.

5. A method comprising:
generating, by a controller, cache IDs for each AI training pipeline of a plurality of AI training pipelines, wherein the controller generates a cache ID for an AI training pipeline of the plurality of AI training pipelines by:
determining a set of attributes of nodes of the AI training pipeline, wherein the set of attributes are attributes of transformations applied by the nodes of the AI training pipeline;
inputting the set of attributes to a cyclic redundancy code (CRC) algorithm, and
outputting, by the CRC algorithm and based on the set of attributes, the cache ID;
accessing, by a leaf node, training data elements included in a training data set;
generating, by the leaf nodes, data identities (IDs) corresponding to the training data elements;
receiving, by a sampler, the data IDs and an associated cache ID;
randomizing, by the sampler, the data IDs;
selecting, by the sampler, a subset of the randomized data IDs;
communicating, by the sampler, with a caching server using the subset of randomized data IDs and the cache ID to fetch the training data elements previously cached by a cache node;
receiving, by the sampler from the caching server, a portion of the training data elements present in the caching server corresponding to the subset of randomized data IDs and the cache ID;
forwarding, by the sampler, the portion of the training data elements present in the caching server to at least one consumer node;
fetching, by the leaf node, the training data elements which were not present in the caching server from the training data set; and
forwarding, by the leaf node, the training data elements which were not present in the caching server to at least one transformation node for training a neural network.

6. The method of claim 5, wherein two AI training pipelines having a same cache ID share a same allocated cache memory in the caching server.

7. The method of claim 5, wherein determining the set of attributes of nodes of the AI training pipeline comprises:
   appending attributes from each node of the AI training pipeline to a temporary buffer; and
   inputting the temporary buffer to the CRC algorithm.

\* \* \* \* \*